United States Patent [19]

Nishiyama et al.

[11] Patent Number: 4,669,782
[45] Date of Patent: Jun. 2, 1987

[54] BELT ANCHOR INCORPORATING SEAT TRACK STRUCTURE

[75] Inventors: Yuji Nishiyama, Kitano; Tateo; Masakazu Hashimoto, all of Toyota, Japan

[73] Assignee: Toyota Jidosha Kabushiki Kaisha, Aichi, Japan

[21] Appl. No.: 906,407

[22] Filed: Sep. 12, 1986

[30] Foreign Application Priority Data

Sep. 20, 1985 [JP] Japan .................. 60-143584[U]
Sep. 20, 1985 [JP] Japan .................. 60-143585[U]

[51] Int. Cl.$^4$ ............................................. A62B 35/02
[52] U.S. Cl. ................................... 297/473; 297/468
[58] Field of Search ............... 280/801; 297/473, 468, 297/482; 248/430, 429, 903, 393

[56] References Cited

U.S. PATENT DOCUMENTS

| 4,262,963 | 4/1981 | Bauer et al. | 297/473 |
| 4,422,612 | 12/1983 | Frank | 248/430 |
| 4,482,188 | 11/1984 | Tilly | 297/473 |
| 4,526,424 | 7/1985 | Korth | 297/473 |

FOREIGN PATENT DOCUMENTS

| 3018811 | 11/1981 | Fed. Rep. of Germany | 297/473 |
| 3226932 | 1/1984 | Fed. Rep. of Germany | 297/473 |
| 0008957 | 1/1980 | Japan | 297/473 |
| 60-257 | 1/1985 | Japan. | |

Primary Examiner—James T. McCall
Attorney, Agent, or Firm—Parkhurst & Oliff

[57] ABSTRACT

A belt anchor incorporating seat track structure for a vehicle designed to support a seat on the body of the vehicle in such a manner that the seat is movable in the longitudinal direction of the vehicle. An upper rail which is rigidly secured to the seat and to which a belt anchor is rigidly secured is adapted to be movable in the longitudinal direction of the vehicle along a lower rail supported on the vehicle body. The lower rail has a bent portion formed at the upper end thereof, and one end of the belt anchor is received in this bent portion. An extended portion is formed on a bracket which is employed to rigidly secure the lower rail to the vehicle body, the extended portion being rigidly secured on the outer periphery of the bent portion. Accordingly, the bent portion of the lower rail is strengthened.

27 Claims, 7 Drawing Figures

BELT ANCHOR INCORPORATING SEAT TRACK STRUCTURE

BACKGROUND OF THE INVENTION

1. Field of the Invention

The present invention relates to a seat track structure employed in a seatbelt system for a vehicle designed to protect an occupant in an emergency situation of the vehicle, the seat track structure incorporating a belt anchor for anchoring the seatbelt system to the body of the vehicle.

2. Description of the Related Art

In general, a seat for an occupant of a vehicle is mounted on the floor of the vehicle body through a seat track constituted by a lower rail which is secured to the floor surface and an upper rail which is secured to the seat and adapted to be slidable on the lower rail together with the seat.

On the other hand, the inner belt of the seatbelt system is secured directly to the floor of the vehicle body without any relation to the seat track. Therefore, the tension generated in the webbing by the inertia acting on the occupant's body when an emergency situation of the vehicle occurs is directly supported by the floor.

There is another conventional arrangement in which the inner belt is secured to the seat so that the webbing can be fastened to the body of the occupant at a constant position at all times regardless of the occupant's adjusting the position of the seat in the longitudinal direction of the vehicle. With this arrangement, however, when an emergency situation of the vehicle occurs, the seat track is subjected to a large load which acts such as to separate the upper and lower rails from each other, and it is therefore necessary to make the seat track more solid.

The lower rail of the seat track is generally bent at the upper end thereof in the horizontal direction, and the upper rail is mounted on the lower rail in such a manner as to cover this bent portion of the lower rail. Therefore, in order to strengthen the seat track, it is necessary to enlarge the width of the seat track, and this leads to a reduction in the leg space for the occupant in the rear seat.

To overcome this problem, a structure has already been proposed in which, despite that the inner belt is secured to the seat, the seat track is not subjected to a large load even when an emergency situation of the vehicle occurs (see, e.g., Japanese Utility Model Laid-Open No. 257/1985). With this conventional arrangement, however, it is necessary to lay a rail and the like on the vehicle body separately from the seat track, so that the structure is complicated.

The present inventors have already proposed a structure in which the seat track is arranged vertically, and a load which is transmitted to the seat track from the belt anchor is supported by a retaining means which is movable in the lateral direction of the vehicle and extends through the seat track, thereby preventing separation of the upper and lower rails (see U.S. patent application Ser. No. 863,423).

In this structure, however, the bracket connecting the lower rail to the vehicle body is applied only for fixing the lower rail to the vehicle body. Also, since a part of a large load acting on the belt anchor in the emergency situation acts such as to separate the bent portion of the lower rail and the end portion of the belt anchor received in the bent portion from each other, it is preferable to strengthen a resistance to the separation therebetween.

SUMMARY OF THE INVENTION

In view of the above-described circumstances, it is a primary object of the present invention to provide a belt anchor incorporating seat track structure in which the bracket is utilized effectively and the resistance to the separation between the bent portion of the lower rail and the end portion of the belt anchor received in the bent portion is strengthened.

To this end, the present invention provides a belt anchor incorporating seat track structure for a vehicle, which comprises: a seat track having a lower rail rigidly secured to the vehicle body, and an upper rail slidable along the lower rail in the longitudinal direction of the vehicle; a belt anchor rigidly secured to the upper rail and adapted to be movable together with a seat provided on the vehicle; a bent portion defined by the upper end portion of the lower rail as viewed in the vertical direction of the vehicle, said upper end portion being bent in a substantially U-shape in cross-section so that the opening of the bent portion faces the lower side of the vehicle, the bent portion being adapted to receive one end portion of the belt anchor; a bracket for rigidly securing the lower rail to the vehicle body; and an extended portion defined by a portion of the bracket which is extended along the outer periphery of the bent portion and rigidly secured to said outer periphery to enhance the strength of the bent portion of the lower rail.

By virtue of the above-described arrangement, the load transmitted to the one end portion of the belt anchor is reliably sustained by the bent portion and the extended portion.

DESCRIPTION OF THE PREFERRED EMBODIMENT

The belt anchor incorporating seat track structure according to the present invention will be described hereinunder in detail with reference to the accompanying drawings.

Figure 1:
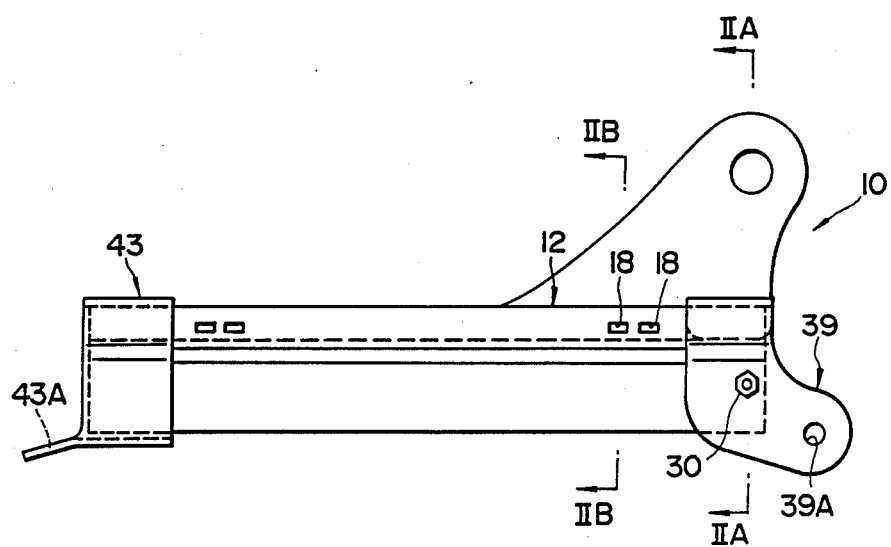
FIG. 1 is a side view of a belt anchor incorporating seat track structure in accordance with a first embodiment of the present invention.

FIGS. 1 and 2 show in combination a seat track 10 in accordance with a first embodiment of the present invention.

The seat track 10 has a lower rail 12 which is rigidly secured to the body of a vehicle and an upper rail 14 which is rigidly secured to a seat provided on the vehicle. These rails 12 and 14 are adapted to move relative to each other in the longitudinal direction of the vehicle, thus allowing the seat to move in this direction.

Figure 2A:
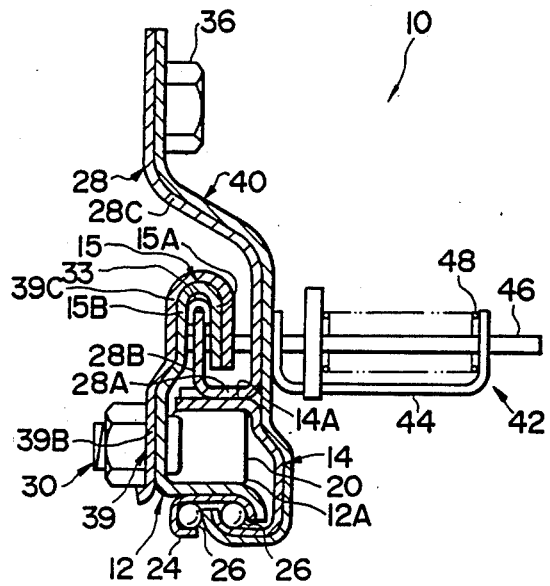
FIG. 2A is a sectional view taken along the line IIA—IIA in FIG. 1.
Figure 2B:
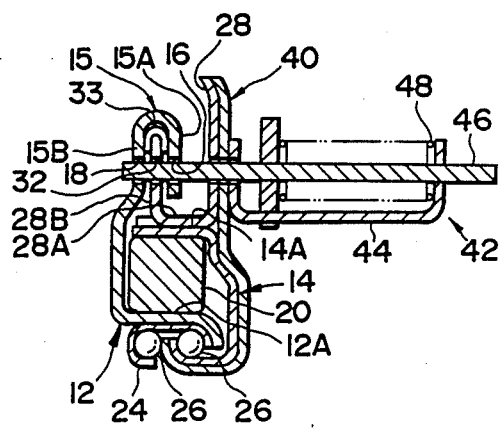
FIG. 2B is a sectional view taken along the line IIB—IIB in FIG. 1

The lower rail 12 is, as shown in FIG. 2B, bent so as to have a substantially L-shaped cross-section. The end portion of the vertical portion of the lower rail 12 is bent so as to provide a bent portion 15 having a U-shaped crosssection, the opening of this bent end portion facing the floor surface of the vehicle body.

The parralel portions 15A, 15B of the bent portion 15 are respectively provided with a plurality of rectangular bores 16, 18 which are coaxial with each other and arranged at predetermined spacings in the longitudinal direction of the vehicle body.

A plurality of rollers 20 which define a part of support means are disposed on the bottom portion 12A of the lower rail 12, the upper rail 14 being supported on the lower rail 12 through the rollers 20.

The upper rail 14 is bent in an L-shape in cross-section so as to surround the rollers 20 together with the lower rail 12. The lower end portion of the upper rail 14 is bent in such a manner as to pass around below the bottom portion 12A of the lower rail 12 so as to overlap the lower rail 12. In addition, a guide plate 24 which has a substantially U-shaped cross-section is rigidly secured to the lower side of the overlapping portion of the lower rail 12, the guide plate 24 having both lateral end portions extending toward the lower side of the vehicle. The distal end portion of the upper rail 14 is bent so as to extend substantially upward, and accommodated in the laterally central portion of the guide plate 24.

A plurality of balls 26 which define another part of the support means are accommodated in each of the spaces which are defined between both bent lateral end portions of th guide plate 24 and the upwardly extending end portion of the upper rail 14 which enters the area defined between these bent lateral end portions. The balls 26 serve to prevent occurrence of play or chattering between the lower and upper rails 12, 14 and to enhance the slidability of the upper rail 14 which is offered by the rollers 20.

Th base portion 28A of the belt anchor 28 which is defined by the intermediate portion thereof is secured to the upper flat portion 14A of the upper rail 14.

A pair of parallel leg plates 28B, 28C extend upwardly from the two lateral ends of the base portion 28A. The leg plate 28B is inserted into the area between the parallel portions 15A, 15B of the bent portion 15 of the lower rail 12. A rectangular bore 32 is provided in the end portion of the leg plate 28B in such a manner that the bore 32 can be made coaxial with the rectangular bores 16, 18 by moving the upper rail 14 in the longitudinal direction of the vehicle. In addition, a slide piece 33 is fitted over the distal end of the leg plate 28B, and the parallel portions 15A, 15B clamp the leg plate 28B through this slide piece 33, thereby preventing occurrence of play or chattering therebetween.

The other leg plate 28C is bent at its intermediate portion so that the leg plate 28C as a whole has a substantially S-shaped cross-section. One end of an inner belt (not shown) is rigidly secured to the upper end portion of the leg plate 28C by means of nut 36 which is welded to the upper end portion of the leg plate 28C.

The end face of the leg plate 28C of the belt anchor 28 has, as shown in FIG. 1, a triangular shape one of the vertices of which is defined by the end portion thereof which is connected to the inner belt. Thus, the load which is transmitted from the inner belt is transmitted to the vehicle body while being dispersed in the longitudinal direction of the vehicle.

It should be noted that the other end of the inner belt is provided with a buckle device and mounted on the upper surface of the seat.

As shown in FIG. 2A, a bracket 39 is provided for supporting on the vehicle body one end portion of the lower rail 12 on the side thereof which is closer to the rear end of the vehicle. More specifically, the intermediate portion 39B of this bracket 39 and the lower rail 12 are rigidly secured to each other by means of a securing pin 30. The bracket 39 has an extended portion 39C which is extended from the intermediate portion 39B and bent in a substantially U-shape along the bent portion 15, this portion 39C being rigidly secured to the outer periphery of the bent portion 15. Accordingly, a part of the load which acts on the belt anchor 28 is transmitted directly to the vehicle body through the bracket 38, which means that the securing pin 30 is allowed to have a relatively small size. The other end portion of the bracket 39 is bent so as to extent toward the rear end of the vehicle, and a bore 39A having a circular cross-section is provided in the distal end portion thereof. Thus, the bracket 39 is rigidly secured to the vehicle body through a bolt (not shown) which is received through the bore 39A.

There is provided another bracket 43 which is adapted to support the portion of the lower rail 12 on the side thereof which is closer to the front end of the vehicle. The bracket 43 has a substantially L-shaped configuration in plan view. As shown in FIG. 1, one end portion of the bracket 43 is extended and bent along the outer periphery of the bent portion 15 of the lower rail 12 as well as the bracket 39, and rigidly secured to the lower rail 12 over a relatively wide area from the lower surface to the side surface of the lower rail 12. The other end portion of the bracket 43 has a circular bore 43A provided in the distal end portion thereof and rigidly secured to the vehicle body through a bolt (not shown) which is received through the bore 43A.

The seat track 10 arranged as detailed above is rigidly secured to the seat through a reinforcement member 40.

The reinforcement member 40 is rigidly secured to the upper rail 14 and the belt anchor 28 in such a manner that the reinforcement member 40 extends vertically along them. In addition, a lock mechanism 42 which serves as seat retaining means is mounted on the reinforcement member 40.

The lock mechanism 42 is rigidly secured to the reinforcement member 40 through a bracket 44. The lock mechanism 42 has a lock pin 46 and a compression coil spring 48. The lock pin 46 is normally biased by the compression coil spring 48 so as to extend horizontally through the rectangular bores 16, 18 and 32. The arrangement is such that, when the occupant actuates a lever (not shown), the lock pin 46 is axially moved against the biasing force from the compression coil spring 48, so that the lock pin 46 can be removed from the rectangular bores 16, 18 and 32.

When an emergency situation of the vehicle occurs, the load which acts on the belt anchor 28 is transmitted to the reinforcement member 40 through the lock pin 46, thereby preventing an excessively large load from acting on the upper rail 14.

The following is a description of the operation of this embodiment.

When the vehicle is in a normal state, the lock pin 46 of the lock mechanism 42 is received through the rectangular bores 16, 18 and 32, and the seat is thereby prevented from moving in the longitudinal direction of the vehicle.

To move the seat, the occupant actuates the lever in such a manner that the lock pin 46 is axially moved against the biasing force from the compression coil spring 48 so as to be temporarily removed from the rectangular bores 16, 18 and 32, thereby allowing the upper rail 14 to move relative to the lower rail 12 and thus enabling the occupant to dispose the seat at any desired position.

Since the lower and upper rails 12 and 14 are respectively retained by the balls 26 and the slide piece 33, the upper rail 14 can slide smoothly without any play or chattering.

When the vehicle runs into an emergency situation, the inertia which acts on the occupant's body causes the belt anchor 28 to be loaded. However, since the belt anchor 28 has the shape of a triangle one of the vertices of which is defined by the joint between the belt anchor 28 and the inner belt 34, the load which acts on the belt anchor 28 is transmitted to the upper rail 14 while being dispersed in the longitudinal direction of the vehicle, and the load is further transmitted to the lower rail 12 through the balls 26 at the portion of the upper rail 14 which overlaps the lower rail 12.

Since the extended portion 39C of the bracket 39 is rigidly secured along the bent portion 15 of the lower rail 12 to strengthen the bent portion 15, a part of the load which acts on the belt anchor 28 is reliably transmitted through the leg plate 28B of the belt anchor 28 to the bent portion 15 and the extended portion 39C of bracket 39 and further transmitted to the vehicle body through this bracket 39. It is therefore possible to reduce the size of the securing pin 30 or the like which is employed to secure the belt anchor 28 and the bracket 39 to each other.

In addition, since a part of the load can be transmitted directly to the lower rail 12 through the lock pin 46 which is horizontally received in the lower rail 12, the upper rail 14 is prevented from being heavily loaded. Accordingly, the width of the seat track can be made smaller than that of the conventional seat track, so that it is possible to enlarge the leg space for the occupant in the rear seat.

Figure 3:
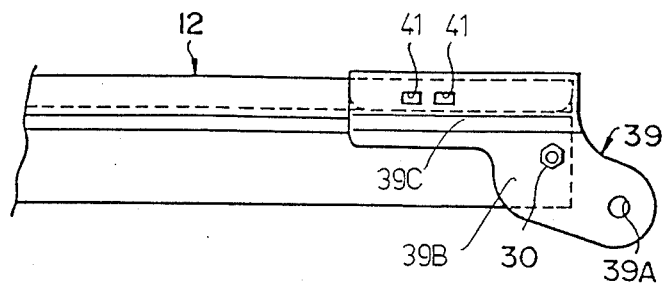
FIG. 3 is a side view of the bracket in the case where it is extended in the longitudinal direction of the vehicle.
Figure 4:
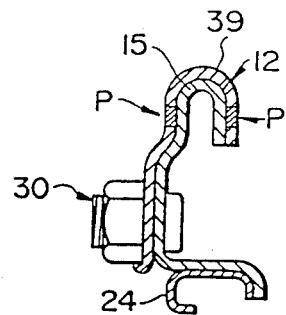
FIG. 4 is a sectional view of another example of the structure of connecting the lower rail and the bracket.

If the extended portion 39C of the bracket 39 is extended in the longitudinal direction of the vehicle so that the extended portion 39C can be rigidly secured to the bent portion 15 over an enlarged area, as shown in FIG. 3, this connecting structure is made even more solid. In such case, the extended portion 39C is provided with bores 41 which are respectively coaxial with the above-described bores 18 for the purpose of selectively receiving the pin 46. As shown in FIG. 4, the bracket 39 and the bent portion 15 of the lower rail 12 may be secured to each other by means of plug welding (as indicated by the arrows P).

Next, a second embodiment of the present invention is described with reference to FIG. 5.

In this embodiment a seat track 110 is applied to a power seat where a seat is driven in front and rear directions of the vehicle by such driving means as a motor (not shown).

Figure 5:
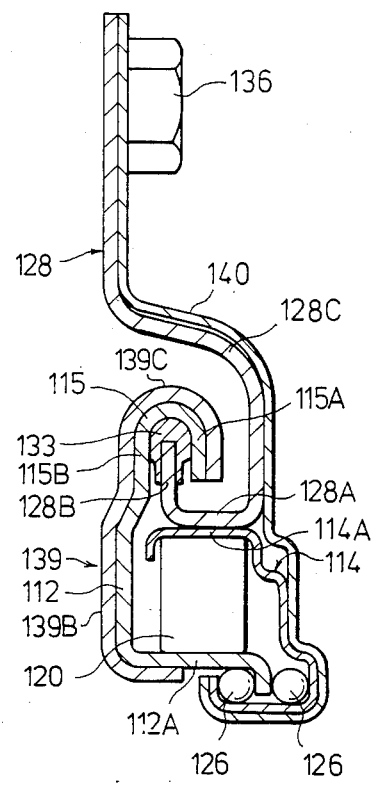
FIG. 5 is a sectional view of a belt incorporating seat track structure of a second embodiment corresponding to FIG. 2A.

As noted from FIG. 5, the seat track 110 is not provided with the lock mechanism 42 provided in the first embodiment, since the power seat is constructed such that, even though a screw (not shown) supported on an upper rail side members is driven by the motor, a nut (not shown engaged with the screw is not moved due to fixation of the nut on lower rail side members, so that the screw is moved with the upper rail side members and, when the motor is stopped, the movement of the upper rail side members is also stopped and the upper rail side members are prevented from further movement by the engagement between the screw and the nut.

The seat track 110 has a lower rail 112 which is rigidly secured to the body of a vehicle and an upper rail 114 which is rigidly secured to a seat provided on the vehicle. These rails 112 and 114 are adapted to move relative to each other in the longitudinal direction of the vehicle, thus allowing the seat to move in this direction.

The lower rail 112 is bent so as to have a substantially L-shaped cross-section. The end portion of the vertical portion of the lower rail 112 is bent so as to provide a bent portion 115 having a U-shaped cross-section, the opening of this bent end portion facing the floor surface of the vehicle body.

A plurality of rollers 120 which define a part of support means are disposed on the bottom portion 112A of the lower rail 112, the upper rail 114 being supported on the lower rail 112 through the rollers 120.

The upper rail 114 is bent so as to surround the rollers 120 together with the lower rail 112. The lower end portion of the upper rail 114 is bent in such a manner as to pass around below the bottom portion 112A of the lower rail 112 so as to overlap the lower rail 112.

A plurality of balls 126 which define another part of the support means are accommodated in each of the spaces of the lower end portion of the upper rail 114 which are defined by the downwardly extending end portion of the bottom portion 112A. The balls 126 serve to prevent occurrence of play or chattering between the lower and upper rails 112, 114 and to enhance the slidability of the upper rail 114 which is offered by the rollers 120.

The base portion 128A of the belt anchor 128 which is defined by the intermediate portion thereof is secured to the upper flat portion 114A of the upper rail 114.

A pair of parallel leg plates 128B, 128C extend upwardly from the two lateral ends of the base portion 128A. The leg plate 128B is inserted into the area between the parallel portions 115A, 115B of the bent portion 115 of the lower rail 112. In addition, a slide piece 133 is fitted over the distal end of the leg plate 128B, and the parallel portions 115A, 115B clamp the leg plate 128B through this slide piece 133, thereby preventing occurrence of play or chattering therebetween.

The other leg plate 128C is bent at its intermediate portion so that the leg plate 128C as a whole has a substantially S-shaped cross-section. One end of an inner belt (not shown) is rigidly secured to the upper end portion of the leg plate 128C by means of a nut 136 which is welded to the upper end portion of the leg plate 128C.

The end face of the leg plate 128C of the belt anchor 128 has a triangular shape one of the vertices of which is defined by the end portion thereof which is connected to the inner belt, as well as the first embodiment. Thus, the load which is transmitted from the inner belt is transmitted to the vehicle body while being dispersed in the longitudinal direction of the vehicle.

A bracket 139 is provided for supporting on the vehicle body one end portion of the lower rail 112 on the side thereof which is closer to the rear end of the vehicle. More specifically, the intermediate portion 139B of this bracket 139 and the lower rail 12 are rigidly secured to each other by means of such a securing means as a securing pin (not shown). The bracket 139 has an extended portion 139C which is extended from the intermediate portion 139B and bent in a substantially U-shape along the bent portion 115, this portion 139C being rigidly secured to the outer periphery of the bent portion 115, as well as the first embodiment. Also, the bracket 39 is rigidly secured to the vehicle body in the same manner as the first embodiment.

Also, a reinforcement member 140 is rigidly secured to the upper rail 114 and the belt anchor 128 in such a manner that the reinforcement member 140 extends vertically along them.

Accordingly, since the extended portion 139C of the bracket 139 is rigidly secured along the bent portion 115 of the lower rail 112 to strengthen the bent portion 115, a part of the load which acts on the belt anchor 128 is reliably transmitted through the leg plate 128B of the belt anchor 128 to the bent portions 115 and the extended portion 139C and further transmitted to the vehicle body through the bracket 139.

Figure 6:
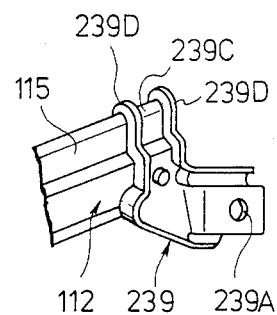
FIG. 6 is a perspective view of a bracket of a third embodiment.

A third embodiment of the present invention is discribed with reference to FIG. 6.

A bracket 239 has an extended portion 239C bent along the outer periphery of the bent portion 115 of the lower rail 112 at its one end portion, and the extended portion 239C is rigidly secured to the outer periphery. The other end portion of the bracket 239 is bent so as to extend toward the rear end of the vehicle, and a bore 239A is provided in the distal end portion thereof. The bracket 239 is rigidly secured to the vehicle body through a bolt (not shown) which is received through the bore 239A.

A bracket 239 is further formed at both the sides thereof with flanges 239D in parallel with each other, so that the bracket 239, especially, the extended portion 239C, is strengthened.

What is claimed is:

1. A belt anchor incorporating seat track structure for a vehicle, which comprises:
   (a) a seat track having a lower rail rigidly secured to the vehicle body, and an upper rail slidable along said lower rail in the longitudinal direction of the vehicle;
   (b) a belt anchor rigidly secured to said upper rail and adapted to be movable together with a seat provided on the vehicle;
   (c) a bent portion defined by the upper end portion of said lower rail as viewed in the vertical direction of the vehicle, said upper end portion being bent in a substantially U-shape in cross-section so that the opening of said bent portion faces the lower side of the vehicle, said bent portion being adapted to receive one end portion of said belt anchor;
   (d) a bracket for rigidly securing said lower rail to the vehicle body; and
   (e) an extended portion defined by a portion of said bracket which is extended along the outer periphery of said bent portion and rigidly secured to said outer periphery to enhance the strength of said bent portion of said lower rail.

2. A belt anchor incorporating seat track structure according to claim 1, further comprising a plurality of rollers which are disposed in the area between said lower and upper rails along the longitudinal direction of the vehicle, said upper rail being supported by said lower rail through these rollers.

3. A belt anchor incorporating seat track structure according to claim 2, wherein said rollers are disposed in the area between the lower end portion of said lower rail and the upper end portion of said upper rail.

4. A belt anchor incorporating seat track structure according to claim 3, wherein the lower end portion of said upper rail is bent in a substantially L-shape and extended below the lower end portion of said lower rail so as to overlap a part of the lower end portion of said lower rail.

5. A belt anchor incorporating seat track structure according to claim 4, further comprising a reinforcement member rigidly secured along both said belt anchor and said upper rail, so that said upper rail and said belt anchor are rigidly secured to said seat through said reinforcement member.

6. A belt anchor incorporating seat track structure according to claim 1, further comprising a slide piece disposed between said bent portion and said one end portion of said belt anchor, thereby preventing occurrence of play or chattering between said bent portion and said end portion of said belt anchor.

7. A belt anchor incorporation seat track structure according to claim 1, further comprising a plurality of bores formed in said lower rail at predetermined spacings along the longitudinal direction of the vehicle and seat retaining means adapted to be selectively received through said plurality of bores for the purpose of retaining said seat at a given position in the longitudinal direction of the vehicle and of transmitting to said lower rail the load which acts on said belt anchor when an emergency situation of the vehicle occurs.

8. A belt anchor incorporating seat track structure according to claim 7, wherein said plurality of bores are formed in each of the opposing walls of said bent portion of said lower rail.

9. A belt anchor incorporating seat track structure according to claim 8, further comprising a plurality of rollers which are disposed in the area between said lower and upper rails along the longitudinal direction of the vehicle, said upper rail being supported by said lower rail through these rollers.

10. A belt anchor incorporating seat track structure according to claim 9, wherein said rollers are disposed in the area between the lower end portion of said lower rail and the upper end portion of said upper rail.

11. A belt anchor incorporating seat track structure according to claim 10, wherein the lower end portion of said upper rail is bent in a substantially L-shape and extended below the lower end portion of said lower rail so as to overlap a part of the lower end portion of said lower rail.

12. A belt anchor incorporating seat track structure according to claim 11, wherein a guide plate is rigidly secured to the lower surface of the lower end portion of said lower rail, the distal end portion of the overlapping portion of said upper rail being bent so as to extend toward the lower surface of the lower end portion of said lower rail, and a plurality of balls are disposed between said guide plate and the distal end portion of the overlapping portion of said upper rail in such a manner that said distal end portion is clamped by said balls, thereby preventing occurrence of play or chattering between said lower and upper rails.

13. A belt anchor incorporating seat track structure according to claim 12, further comprising a reinforcement member rigidly secured along both said belt anchor and said upper rail, so that said upper rail and said belt anchor are rigidly secured to said seat through said reinforcement member.

14. A belt anchor incorporation seat track structure according to claim 13, wherein said seat retaining means has a lock pin which is selectively received through said bores, and biasing means supported by said reinforcement member for biasing said lock pin in a direction in which it is selectively received through said bores.

15. A belt anchor incorporating seat track structure according to claim 7, wherein said bracket is rigidly secured to the rear end portion of said lower rail as viewed in the longitudinal direction of the vehicle, and said extended portion is formed such as to extend toward the forward end of the vehicle and provided with bores which are respectively coaxial with said bores.

16. A belt anchor incorporating seat track structure for a vehicle designed to support a seat on the body of the vehicle in such a manner that said seat is movable in the longitudinal direction of the vehicle, which comprises:
   (a) a lower rail rigidly secured to the vehicle body and extending in the longitudinal direction of the vehicle;
   (b) an upper rail slidable along said lower rail in the longitudinal direction of the vehicle;
   (c) a belt anchor having at the upper end thereof a portion for securing an inner belt of a seatbelt system, said belt anchor being movable together with said seat of the vehicle and rigidly secured to said upper rail;
   (d) a bent portion defined by the upper end portion of said lower rail as viewed in the vertical direction of the vehicle, said upper end portion being bent in a substantially U-shape in cross-section so that the opening of said bent portion faces the lower side of the vehicle, said bent portion being adapted to receive the lower end portion of said belt anchor;
   (e) a bracket for rigidly securing said lower rail to the vehicle body; and
   (f) an extended portion defined by a portion of said bracket which is extended along the outer periphery of said bent portion and rigidly secured to said outer periphery, thereby enhancing the strength of said bent portion of said lower rail.

17. A belt anchor incorporating seat track structure according to claim 16, further comprising a plurality of bores formed in each of the opposing walls of said bent portion at predetermined spacings along the longitudinal direction of the vehicle and seat retaining means adapted to be selectively received through said plurality of bores for the purpose of fixing said seat at a given position in the longitudinal direction of the vehicle and of transmitting to said lower rail the load which acts on said belt anchor when an emergency situation of the vehicle occurs.

18. A belt anchor incorporating seat track structure according to claim 17, further comprising a plurality of rollers which are disposed in the area between said lower and upper rails along the longitudinal direction of the vehicle, said upper rail being supported by said lower rail through these rollers.

19. A belt anchor incorporating seat track structure according to claim 18, wherein said rollers are disposed in the area between the lower end portion of said lower rail and the upper end portion of said upper rail.

20. A belt anchor incorporating seat track structure according to claim 19, wherein the lower end portion of said upper rail is bent in a substantially L-shape and extended below the lower end portion of said lower rail so as to overlap a part of the lower end portion of said lower rail.

21. A belt anchor incorporating seat track structure according to claim 20, wherein a guide plate is rigidly secured to the lower surface of the lower end portion of said lower rail, the distal end portion of the overlapping portion of said upper rail being bent so as to extend toward the lower surface of the lower end portion of said lower rail, and a plurality of balls are disposed between said guide plate and the distal end portion of the overlapping portion of said upper rail in such a manner that said distal end portion is clamped by said balls, thereby preventing occurrence of play or chattering between said lower and upper rails.

22. A belt anchor incorporating seat track structure according to claim 21, further comprising a reinforcement member rigidly secured along both said belt anchor and said upper rail, so that said upper rail and said belt anchor are rigidly secured to said seat through said reinforcement member.

23. A belt anchor incorporating seat track structure according to claim 22, wherein said seat retaining means has a lock pin which is selectively received through said bores, and biasing means supported by said reinforcement member for biasing said lock pin in a direction in which it is selectively received through said bores.

24. A belt anchor incorporating seat track structure according to claim 16, further comprising a slide piece disposed between said bent portion and said lower end portion of said belt anchor, thereby preventing occurrence of play or chattering between said bent portion and said lower end portion.

25. A belt anchor incorporating seat track structure according to claim 17, wherein said bracket is rigidly secured to the rear end portion of said lower rail as viewed in the longitudinal direction of the vehicle, and said extended portion is formed such as to extend toward the forward end of the vehicle and provided with bores which are respectively coaxial with said bores.

26. A belt anchor incorporating seat track structure according to claim 16, wherein said extended portion and said bent portion are rigidly secured to each other by means of plug welding.

27. A belt anchor incorporating seat track structure according to claim 16, wherein the bracket is formed at its both sides with flanges bent in parallel with each other.

* * * * *